United States Patent [19]

Merz

[11] Patent Number: 4,825,391
[45] Date of Patent: Apr. 25, 1989

[54] DEPTH BUFFER PRIORITY PROCESSING FOR REAL TIME COMPUTER IMAGE GENERATING SYSTEMS

[75] Inventor: Donald M. Merz, Ormond Beach, Fla.

[73] Assignee: General Electric Company, Philadelphia, Pa.

[21] Appl. No.: 75,126

[22] Filed: Jul. 20, 1987

[51] Int. Cl.$^4$ ............................................... G01J 1/10
[52] U.S. Cl. .................................... 364/526; 364/518; 364/522
[58] Field of Search .............. 364/194, 424, 514, 524, 364/525, 526, 578, 300

[56] References Cited

U.S. PATENT DOCUMENTS

| | | | |
|---|---|---|---|
| 4,152,766 | 5/1979 | Osofsky et al. | 364/515 |
| 4,181,953 | 1/1980 | Osofsky | 364/515 |
| 4,570,233 | 2/1986 | Yan et al. | 364/522 |
| 4,609,917 | 9/1986 | Shen | 340/729 |
| 4,609,993 | 9/1986 | Shimizu | 364/522 |
| 4,748,572 | 5/1988 | Latham | 364/518 |

Primary Examiner—William L. Sikes
Assistant Examiner—Frank González
Attorney, Agent, or Firm—Stephen A. Young; Paul Checkovich

[57] ABSTRACT

A method for determining color information in a computer image generated display in which the display is divided into a plurality of spans and each span comprises a matrix of pixels, each of the pixels being further divided into a matrix of subpixels, which method and apparatus allows overlapping and inner penetrating faces appearing in an image to be resolved without conflict. Faces of objects appearing in an image are resolved by a range ordering process for each span in an image. The faces are reordered into range separable groups in which a range separable group is defined as faces in which the maximum range to the most distant face in a group does not overlap the minimum range of the nearest face in another group. Each range separable group of faces is then processed on a per pixel basis for determining the color contribution of that face or group of faces to each subpixel within a pixel. In one form, the process of identifying the colors contributing to a pixel may be terminated at the end of processing of one group of faces when at least a minimum number of subpixels within a pixel have been identified as covered by faces in the processed group. Where groups of faces cannot be divided into range separable groups, forced separation of groups can be implemented by establishing a predetermined maximum number of faces in a group or by inserting a pseudo-face within a group and breaking the groups at the pseudo-face.

15 Claims, 12 Drawing Sheets

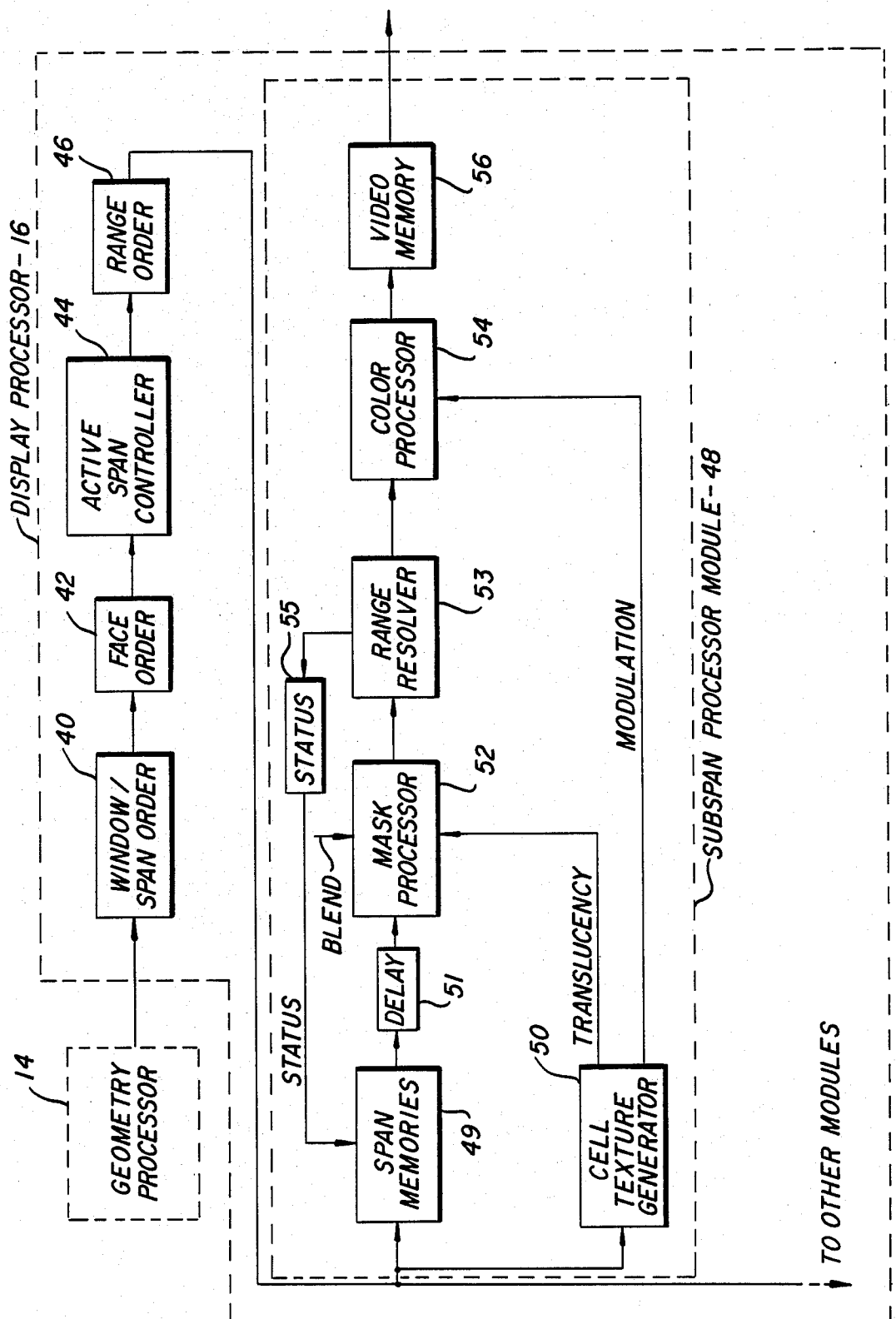

DISTRIBUTION OF SUPERSPAN FEATURES TO SPAN FIFO'S

COLOR PROCESSOR

FIG.15

| COLOR SUM | COLOR STORE | | OUTPUT MASK | | RANGE STORE | | P MASK | |
|---|---|---|---|---|---|---|---|---|
| $12C_3$ | $\begin{matrix} C_3 & C_3 & C_3 & C_3 \\ C_3 & C_3 & C_3 & C_3 \\ C_3 & C_3 & C_3 & C_3 \\ C_3 & C_3 & C_3 & C_3 \end{matrix}$ | ↑ | $\begin{matrix} 1 & 1 & 1 & 1 \\ 1 & 1 & 1 & 1 \\ 1 & 1 & 1 & 0 \\ 0 & 0 & 0 & 0 \end{matrix}$ | + | $\begin{matrix} R_3 & R_3 & R_3 & R_3 \\ R_3 & R_3 & R_3 & R_3 \\ R_3 & R_3 & R_3 & 8 \\ R_3 & R_3 & R_3 & 8 \end{matrix}$ | = | P3 MASK: $\begin{matrix} 1 & 1 & 1 & 1 \\ 1 & 1 & 1 & 1 \\ 1 & 1 & 1 & 0 \\ 0 & 0 & 0 & 0 \end{matrix}$ | + |
| $12C_3+4C_5$ | $\begin{matrix} C_3 & C_3 & C_3 & C_3 \\ C_3 & C_3 & C_3 & C_3 \\ C_3 & C_3 & C_3 & C_3 \\ C_5 & C_5 & C_5 & C_5 \end{matrix}$ | ↑ | $\begin{matrix} 0 & 0 & 0 & 0 \\ 0 & 0 & 0 & 0 \\ 0 & 0 & 0 & 1 \\ 1 & 1 & 1 & 1 \end{matrix}$ | + | $\begin{matrix} R_3 & R_3 & R_3 & R_3 \\ R_3 & R_3 & R_3 & R_3 \\ R_3 & R_3 & R_3 & R_5 \\ R_5 & R_5 & R_5 & R_5 \end{matrix}$ | = | P5 MASK: $\begin{matrix} 1 & 1 & 1 & 1 \\ 1 & 1 & 1 & 1 \\ 1 & 1 & 1 & 0 \\ 0 & 0 & 0 & 0 \end{matrix}$ | + |
| $7C_3+3C_5 + 6C_2$ | $\begin{matrix} C_3 & C_2 & C_3 & C_2 \\ C_3 & C_2 & C_3 & C_2 \\ C_3 & C_2 & C_3 & C_2 \\ C_5 & C_5 & C_2 & C_5 \end{matrix}$ | ↑ | $\begin{matrix} 0 & 1 & 0 & 1 \\ 0 & 1 & 0 & 1 \\ 0 & 1 & 0 & 1 \\ 0 & 0 & 1 & 0 \end{matrix}$ | + | $\begin{matrix} R_3 & R_2 & R_3 & R_2 \\ R_3 & R_2 & R_3 & R_2 \\ R_3 & R_2 & R_3 & R_2 \\ R_5 & R_5 & R_2 & R_5 \end{matrix}$ | = | P2 MASK: $\begin{matrix} 0 & 1 & 0 & 1 \\ 0 & 1 & 0 & 1 \\ 0 & 1 & 0 & 1 \\ 0 & 0 & 1 & 0 \end{matrix}$ | + |
| $5C_3+3C_5 +4C_2+4C_1$ | $\begin{matrix} C_1 & C_1 & C_1 & C_1 \\ C_3 & C_2 & C_3 & C_2 \\ C_3 & C_2 & C_3 & C_2 \\ C_5 & C_5 & C_2 & C_5 \end{matrix}$ | ↑ | $\begin{matrix} 1 & 1 & 1 & 1 \\ 0 & 0 & 0 & 0 \\ 0 & 0 & 0 & 0 \\ 0 & 0 & 0 & 0 \end{matrix}$ | + | $\begin{matrix} R_1 & R_1 & R_1 & R_1 \\ R_3 & R_2 & R_3 & R_2 \\ R_3 & R_2 & R_3 & R_2 \\ R_5 & R_5 & R_2 & R_5 \end{matrix}$ | = | P1 MASK: $\begin{matrix} 1 & 1 & 1 & 1 \\ 0 & 0 & 0 & 0 \\ 0 & 0 & 0 & 0 \\ 0 & 0 & 0 & 0 \end{matrix}$ | + |
| $5C_3+1C_5+4C_2 +4C_1+2C_4$ | $\begin{matrix} C_1 & C_1 & C_1 & C_1 \\ C_3 & C_2 & C_3 & C_2 \\ C_3 & C_2 & C_3 & C_2 \\ C_4 & C_4 & C_2 & C_5 \end{matrix}$ | ↑ | $\begin{matrix} 0 & 0 & 0 & 0 \\ 0 & 0 & 0 & 0 \\ 0 & 0 & 0 & 0 \\ 1 & 1 & 0 & 0 \end{matrix}$ | + | $\begin{matrix} R_1 & R_1 & R_1 & R_1 \\ R_3 & R_2 & R_3 & R_2 \\ R_3 & R_2 & R_3 & R_2 \\ R_4 & R_4 & R_2 & R_5 \end{matrix}$ | = | P4 MASK: $\begin{matrix} 1 & 1 & 0 & 0 \\ 0 & 0 & 0 & 0 \\ 1 & 1 & 0 & 0 \\ 1 & 1 & 1 & 0 \end{matrix}$ | + |

RANGE IC (PRESET):
$\begin{matrix} 8 & 8 & 8 & 8 \\ 8 & 8 & 8 & 8 \\ 8 & 8 & 8 & 8 \\ 8 & 8 & 8 & 8 \end{matrix}$

8-SUBPIXEL COLUMN RANGE
INTERPOLATION

DEPTH BUFFER PRIORITY PROCESSING FOR REAL TIME COMPUTER IMAGE GENERATING SYSTEMS

This application is related to U.S. patent application Ser. No. 810,738 filed 12/19/85 (still pending) for Method of Edge Smoothing for a Computer Image Generation System and to U.S. patent application Ser. No. 810,737 filed 12/19/85 (still pending) and titled Method of Comprehensive Distortion Correction for a Computer Image Generation System, both assigned to the assignee of the present application.

FIELD OF THE INVENTION

This invention relates generally to the field of computer image generation systems, and more particularly, to area processing of a computer generated image for use in real time imaging systems.

BACKGROUND OF THE INVENTION

Real time computer generated image systems are being designed to provide realistic image reproduction for a variety of simulator systems, such as tank simulators and flight simulators. In these systems, image generation can be broken down into three separate processing stages: controller, geometry processor, and display processor. These three processing stages each work independently on data corresponding to one of three consecutive images to be displayed. The controller processes data on an image or scene for a fixed time and then passes its processed data to the geometry processor. The geometry processor has an equal amount of time to do its calculations and at the end of that time its results are sent to the display processor. The display processor processes the data for displaying it on a video display. For each time interval, all three processors are kept busy, so that at any given time, the processors are working on three separate scenes. Each section processes inputs and generates outputs during the interval, so data flows to the three stages in a sequential manner. The computation load is spread out among the specialized processor sessions so this allows new scenes to be displayed each field or frame time.

To maximize the efficiency of the processors, a scene or image (which is eventually displayed) is divided into a plurality of spans for processing. Conceptually, a span can be thought of as a small rectangular area on the display screen. Each span is comprised of a matrix of pixels. An object (such as a tank) which is to be displayed is comprised of individual faces, where each face is bounded by straight edges, i.e., a face is an uninterrupted or continuous area. A simple example is a monocolor two-dimensional box which can be defined as a single face. As is evident, a face may cover a number of spans and a span may contain a number of faces. The overall goal in an area (span) processor is to maximize the efficiency of the above mentioned processors and provide a realistic correct image while satisfying real time processing constraints.

In a typical flight simulator system, inputs are received by a controller section and passed to a geometry processor. The input received by the controller are pilot inputs supplied to an environmental definition and converted to pixel video display information. The geometry processor reads from a data-base description of objects that are potentially visible and stored in a three-dimensional digital representation of the screen. The objects that are read are rotated in display coordinates using rotation matrices calculated in the controller. The geometry processor mathematically projects the three-dimensional data onto a two-dimensional display window. Previous geometry processors calculated objects which were in front or behind each other and stored this information in a priority list. Since each object processed is made up of individual faces, where each face is in the form of a part unbounded by straight edges, the priority list contained the order of all faces in the scene starting with the first face. In other words, the highest priority face was first and the last face in the list was the lowest priority face. Previously, whenever two faces overlapped on the display, the higher priority face was visible and the lower priority face was obscure. However, geometry processors have three basic shortcomings. First, they cannot process interpenetrating faces; second, they cannot handle priority circularities in real time; and third, they have difficulty resolving priority of moving objects.

FIG. 1 shows an example of interpenetrating faces in which face B penetrates face A. As is evident, it is difficult to determine which face has the higher priority.

FIG. 2 shows an example of priority circularity where face C has higher priority than face D, and face D has higher priority than face E; however, face E has higher priority than face C. These problems can be solved by a "z" or depth buffer priority scheme in accordance with the present invention.

SUMMARY OF THE INVENTION

It is an object of the present invention to provide a method for overcoming the above described disadvantages of prior geometry processors. It is another object to provide a depth buffer which is capable of removing all constraints on priority and permitting such visual effects as interpenetrating faces, priority circularities and moving objects in a real time computer image generation system.

It is a still further object to provide a depth buffer which resolves the priority of faces for very high speed image generation.

Another object of the present invention is to provide a method for determining the color of each pixel of a span where face elements are prioritized on the basis of a distance from a viewpoint.

The above and other objects are achieved in a depth buffer and method for determining color information in a computer image generation display for each pixel of an image. In this method, the image is divided into a plurality of spans where each span comprises a matrix of pixels, each pixel comprising a matrix of subpixels. Each object of the image is comprised of a plurality of faces, each face being ordered by an apparent range from a viewpoint to a predetermined location of a span. The plurality of faces are re-ordered into range separable groups. A range separable group includes faces in which the maximum range to each face does not overlap the minimum range of another group. Each range separable group of faces is then processed by depth buffering and a color for each pixel of a span is then determined. If the number of faces in a group becomes excessive, forced separation can be used to create smaller groups. Furthermore, a method is presented for establishing a pixel color without identifying a face color for each sub-pixel. Still further, a processing method is disclosed for accelerated processing by dividing each span into a plurality of sub-spans, each subspan being processed by dedicated hardware whereby a subspan not covered by a face being processed is not processed for that face.

BRIEF DESCRIPTION OF THE DRAWINGS

For a better understanding of the present invention, reference may be had to the following detailed description taken in conjunction with the accompanying drawings in which:

FIG. 5 is a block diagram of a depth buffer implemented in the display processor in accordance with the present invention;

FIG. 11 shows a typical pseudo-random sequence for filling subpixels of a pixel with translucent data from the cell texture generator;

FIG. 12 shows examples of both additive and multiplicative translucency;

FIG. 15 illustrates operation of the depth buffer on a subpixel basis for a pixel in accordance with the present invention;

DETAILED DESCRIPTION OF AN ILLUSTRATIVE EMBODIMENT

A. General Description of area processor.

With reference to the drawings in general, there is illustrated a method in one form of the invention for determining color information in a computer image generation display for each pixel of an image. In this method, the image is divided into a plurality of spans where each span comprises a matrix of pixels, each pixel comprising a matrix of subpixels. Sequentially, for each face of a plurality of faces appearing in each span, an apparent range from a viewpoint to a predetermined location of a span is identified. The plurality of faces in a span are reordered into range separable groups. A range separable group includes faces which overlap mutually but which collectively do not overlay with any other group. Each range separable group is then processed for generating a color for each pixel covered by faces in the group.

Figure 2:
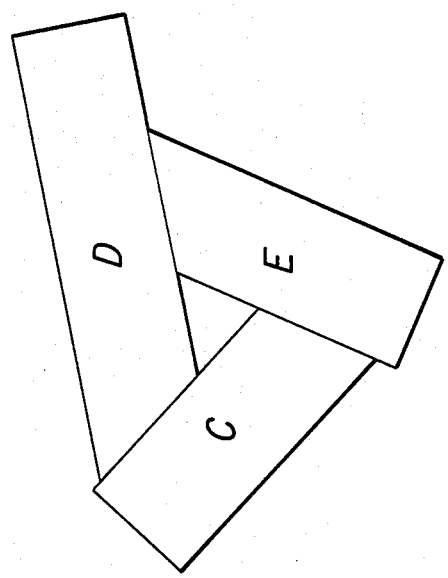
FIG. 2 illustrates priority circularity of multiple faces.
Figure 1:
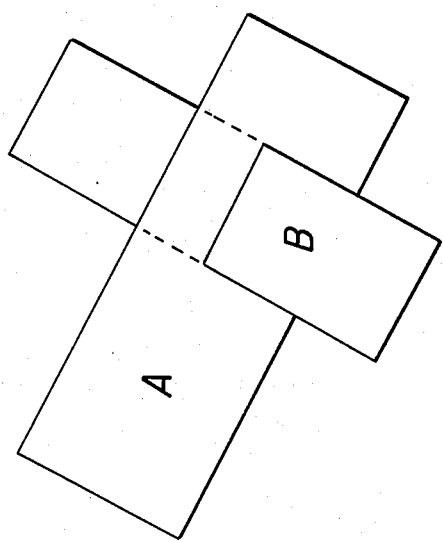
FIG. 1 illustrates a pair of interpenetrating faces.
Figure 3:
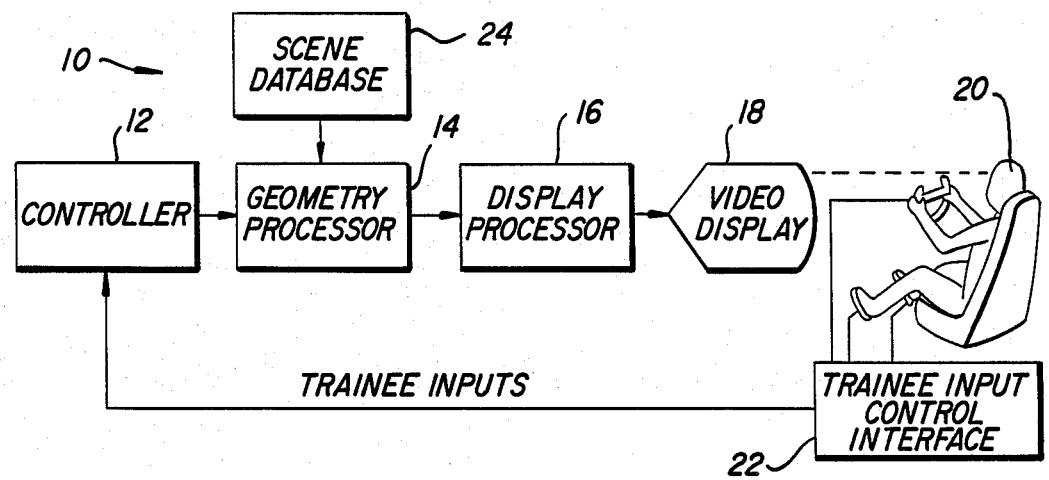
FIG. 3 is a simplified functional block diagram of a computer image generation system.

More particularly and with specific reference to FIG. 3, a computer image generation system 10 includes a controller 12, a geometry processor 14, and a display processor 16. Briefly, the display processor 16 displays information to a display window 18 for simulating the movement of an object such as an aircraft over a scene. A pilot 20 generates maneuvering actions in the cockpit, which are fed to input control interface 22. The input control interface 22 converts appropriate flight data, such as aircraft position, roll, pitch, and yaw generated by the pilot, and supplies the converted information to controller 12.

In controller 12, the pilot inputs are used for calculating a new position and orientation of the aircraft and from this a mathematical rotation matrix is calculated for rotating objects from a reference coordinate system to a display coordinate system. Other information dealing with the scene, the position of a target, or other aircraft is calculated in controller 12. Controller 12 updates periodically the most recent aircraft orientation and works on a scene for a field time and then passes the data to geometry processor 14.

Geometry processor 14 reads from a scene database memory 24 descriptions of objects such as towers, roads, rivers, hangars, etc. which are potentially visible in the stored three-dimensional digital representation of the earth. Objects are read from the scene database and are rotated in display coordinates using the rotation matrix calculated in controller 12. Edges of these three-dimensional objects are clipped by geometry processor 14 if they extend beyond the view window boundaries. Geometry processor 14 mathematically projects the three dimensional data onto the two-dimensional display window. Object faces which extend beyond display window boundaries are then clipped in two-dimensional image space. The two-dimensional objects consist of points, lines, closed convex polygons or combinations thereof. Each closed convex polygon is known as a face. Thus, each object is made up of individual faces where each face is bounded by straight edges and has a predetermined color intensity value assigned thereto. Once the faces are computed from the three-dimensional objects, in geometry processor 14, the data are passed to display processor 16. In addition, geometry processor 14 calculates range information for each face. The range information is defined as the distance from the eye of the pilot to a predetermined location of a face in a span. The range list includes the order of all faces in the scene. Prior to the subject invention the geometry processor had to use range and associated data, such as non-visible separation planes, to develop a priority list of all faces in the scene, from highest priority to lowest. When thousands of faces are involved, priority listing is a database and computational-intensive process.

The geometry processor calculates display end points of line segments that bound the two-dimensional faces and calculates the coefficients of the line equation that describe the bounding edges. The geometry processor 14 also calculates end points of each edge and the slope of each edge that describe a bounding face. These data are then passed on to display processor 16.

Display processor 16 represents a majority of processing hardware in a real time computer image generation system and, for this reason, most of the efforts to reduce hardware and processing time is concentrated in the display processing area. The display processor 16 resolves for each pixel in view of the display 18 what color the pixel should be, given the many faces that can be present in a pixel and those portions of faces that may be covered by other faces. The display processor 16 includes depth buffer priority processing which resolves the priority conflicts within a pixel, i.e., which faces will or will not contribute to pixel color. After resolving the priority conflicts within a pixel, the area of each visible face within the pixel multiplied by the color of the face and the sum of all of these weighted colors is output as a pixel color or color intensity control value.

To effectively process all the information in each color display in a system, display processor 16 processing includes the generation and the processing of spans. Spans are small rectangular areas of display fixed in size and shape which cover the view window. Ideally, the position of a span is fixed in position on a video display. Spans may be grouped to form "superspans", e.g., a $2 \times 2$ matrix of spans is referred to herein as a superspan although other numbers of spans could be grouped. Furthermore, spans may be divided into "subspans", e.g., a $2 \times 2$ matrix of subspans may form a span. Such grouping is generally dictated by processor size and desired time of processing.

Figure 4:
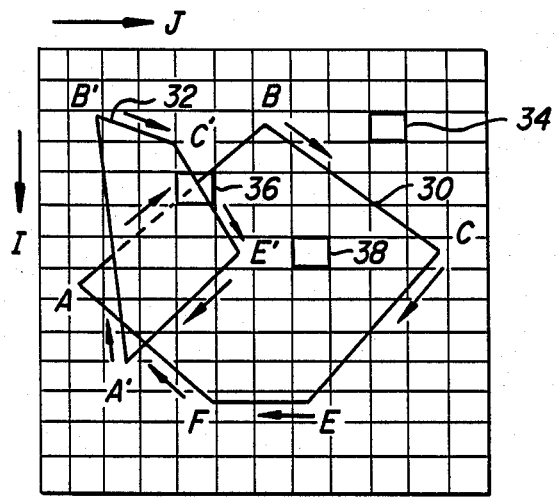
FIG. 4 illustrates the relationship between faces, spans and edges.

As is apparent, some spans at the boundary of the face will contain only a small portion of the face and some spans will be completely covered by the face. FIG. 4 shows a face 30 and a face 32 and a set of spans that need to be identified in order to process the face in detail. In particular, span 34 is outside face 30 and face 32. Span 38 is wholly contained within face 30 and not within face 32 and span 36 is on the edge of face 30 and face 32. The part of the face that lies within each span is processed in detail by the span processing of the display processor. For a more detailed description of spans, faces, and span processing reference is made to U.S. patent application Ser. No. 810,738 filed Dec. 19, 1985 (still pending) and titled Method of Edge Smoothing for a Computer Image Generation System and to U.S. patent application Ser. No. 810,737 filed Dec. 19, 1985 (still pending) and titled Method of Comprehensive Distortion Correction for a Computer Image Generation System, the disclosure of both of which are hereby incorporated by reference.

B. Depth Buffer

Referring to FIG. 5 there is shown one implementation of a depth buffer for display processor 16. Organization and operation of the area processor are basically similar to that of the aforementioned copending U.S. patent application Ser. No. 810,737. The range information and edge data for each face processed by processor 14 is coupled to depth buffer display processor 16 which comprises apparatus, blocks 40–46, for ordering faces within spans or windows by range. The range ordered faces are then processed by a plurality, e.g., four, of subspan processor modules 48. The window/span orderer 40 operates as described in U.S. patent application Ser. No. 527,809 (now abandoned) to identify spans/windows intersected by each edge of each face. The window function of window/span orderer 40 scans edges to identify superspans which they intersect. The intersections are then ordered by superspan number in the span order function of block 40. Face orderer 42 processes the feature edges intersecting a superspan one superspan at a time. (Superspans are essentially four spans and windowing is performed on superspans). During processing in block 40, the feature edge is scanned by interleaving such that more than one feature or face may be scanned concurrently so that intersections become intermixed. Face orderer 42 re-arranges intersections by face number so that intersections for each face within a superspan are grouped.

The active span controller 44 generates covering faces and puts them in the proper position in a datascene list. The range orderer 46 orders the intersections with superspans by nearest range.

On output from the range orderer 46, faces which intersect a superspan are sent to a specified sub-span processor module 48 of which a varying number may be used, typically from one to four modules, depending on the system application. The preferred embodiment uses four modules, each module being sized proportional to the subspan size (number of pixels) so that one subspan may be processed for each clock cycle in each module, thereby processing one span per clock cycle. If one subspan is not intersected by a face being processed, then that subspan does not require processing, thus saving some processing time. In a module, intersecting faces are distributed to one or more of four span memories 49. Faces which do not contribute to a span are not stored to its memory. On output to a span memory, range-overlapping faces are organized into groups. Input of superspan faces is terminated early if all subspans have received opaque covering faces (which occult any subsequent longer range features).

Faces are read from memories and processed in span groups in group order sequence, one subspan at a time. Subspan groups of faces are interleaved (up to 64 subspans may be interleaved in a module) in a manner analogous to interleaving of faces in the previously cited applications. More particularly, first groups of faces for each of a plurality of spans (or subspans) are provided sequentially in a "pipeline" arrangement so that each span is processed for at least one group before a second group of faces is processed for any span of the plurality of spans, e.g., 64. If the first group of faces provides color data for all pixels (subpixels) in a span, then no new groups need be processed for that span. Within a group, faces are processed in the sequence read from span memory. Subspan face identification is sent to a cell texture generator 50 for development of perdisplay pixel translucency and modulation. Edge data from span memories 49 are delayed by a delay block 51, which may be a clocked register of a type well known in the art, until translucency data are available from generator 50 so that edge data for a face and translucency data reach a mask processor 52 at appropriate times. These data are then used to generate the subspan subpixel face mask. The output of mask processor 52 is a subpixel mask adjusted for both translucency (from block 50) and programmed blend (from geometry processor 14). The latter is used for translucent features such as helicopter rotors and for level-of-detail transitioning. The adjusted subspan mask and associated range data are passed to a range resolver 53 for priority resolution. The range resolver 53 receives range representation at the ends of 8-subpixel columns, the range being developed externally by bilinear interpolation from superspan corners. Range resolver 53 linearly interpolates range to the center of each subpixel and stores the nearest range of any feature in the subspan to date for each subpixel. If enabled by the subpixel mask input, it compares interpolated and stored ranges for the subpixel and stores the nearer. If the input subpixel range is less than the previously stored range, resolver 53 outputs this as a modified mask. The range resolver 53 also accepts, stores, and compares a layer number for resolving coplanar faces at the same range, such as a runway stripe on the middle of a runway. The modified subpixel mask is sent to a color processor 54. Processing for a subspan ends when, at the end of a face group, the subspan is full (all subspans have been processed). At this time the range resolver 53 outputs a Subspan Full flag to the color processor 54, to enable storage to video memory 56, and to status memory 55, to prevent processing subsequent face groups.

The color processor 54 processes data for each display pixel of a subspan. Color processor 54 has several functions. It calculates feature color for a pixel using the equation:

$$C = F*M*If*Cf + (1-F)*Ih*Ch$$

for each color component, i.e., red, green and blue, where F is distance fading (fogging), M is cell texture modulation and/or curved surface shading, If is feature illumination, Cf is programmed face color, Ih is haze illumination, and Ch is programmed haze color. When incident (background) illumination is used, If and Ih are programmed values. When the feature is illuminated artificially (landing lights, head lights, etc.), If and Ih are varied according to the light source pattern and the range to the feature. When the feature is a light source, illumination is unity. The color processor 54 also stores the color for each subpixel when enabled by the modified mask from the range resolver 53, replacing any previously stored (in the current face group) subpixel color. At the end of a face group, color processor 54 sums the subpixel colors and combines this with color accumulated from previous groups. This is output to video memory 56 on receipt of subspan full indication from the range resolver 53.

Video memory 56 is ping pong and stores both fields for a module. When more than one module 48 is used, video memories may be interconnected as necessary, depending on the displays and on superspan assignment.

Detailed Operation of Depth Buffer

Reciprocal range to a face at any point, I,J in the view window is defined as:

$$R = C4 + C5I + C6J$$

where C4, C5 and C6 are determined by the geometry processor 14 for each face. C4 is the reciprocal range to the face, extended if necessary, at a fixed point such as the top left corner of the view window; C5 is the change in reciprocal range per unit change in J (horizontal direction). The geometry processor also provides minimum and maximum face ranges which it has determined from computing and comparing ranges at face vertices.

Figure 7:
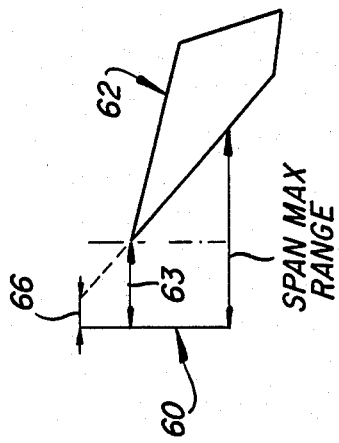
FIG. 7 is a side view of FIG. 6 showing the range values from a viewpoint to a span corner and a face.
Figure 6:
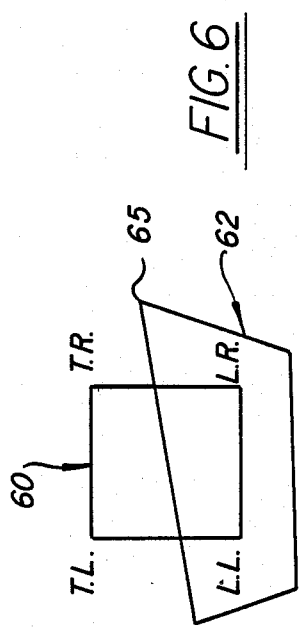
FIG. 6 is a front view of a face intersecting a superspan.

Using the above relationship, reciprocal range is computed at each corner of a superspan. Superspan-minimum range is determined as the least corner range or face-minimum, whichever is greater. Referring to FIG. 6, there is represented a superspan 60 which is partially covered by face 62. FIG. 7 shows the range view for face 62 of FIG. 6. For this example it is evident that the range to the extended face (at top right TR or top left TL superspan corner) is too short. While the face-minimum range 63 to face 62 measured at the indicated vertex 65 is also too short, since it does not fall within the superspan, it is closer to the correct value and is therefore preferred.

In a similar manner superspan-maximum range is determined as the greatest corner range or face-maximum, whichever is less. For the example of FIG. 6 this is at a superspan corner (bottom right LR or bottom left LL).

Figure 8:
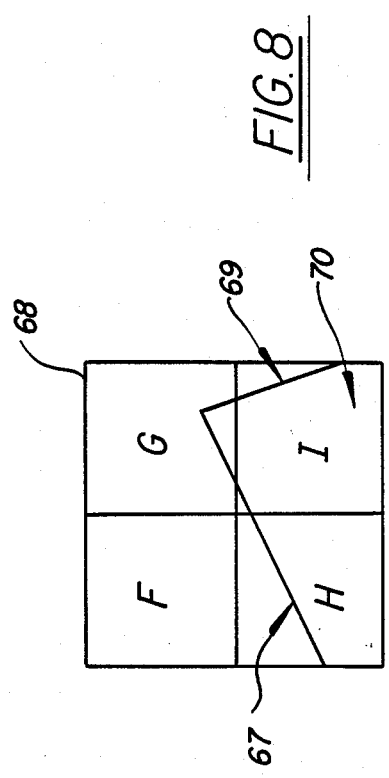
FIG. 8 illustrates the relationship between spans and superspans.
Figure 9:
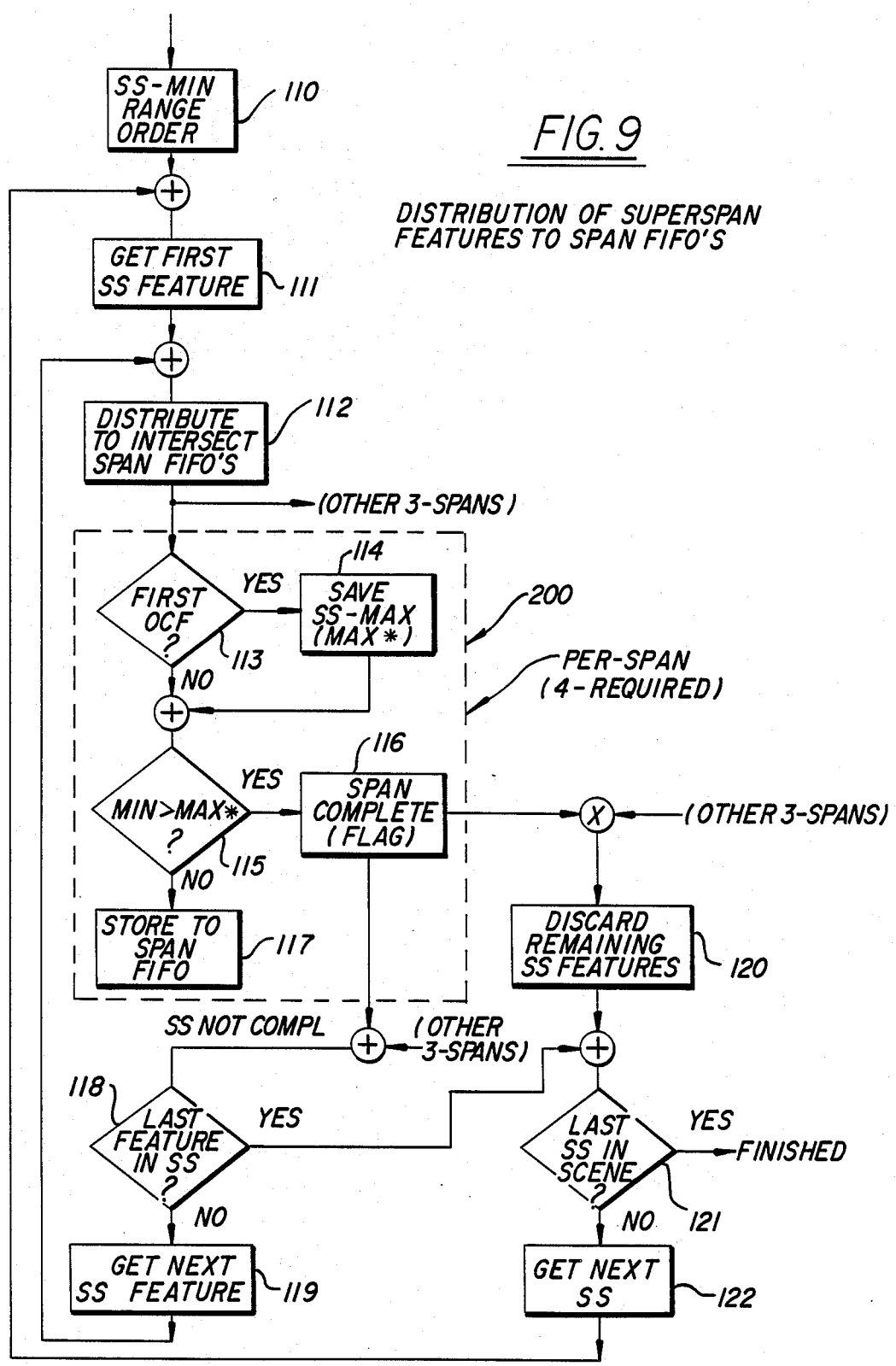
FIG. 9 is a detailed flow diagram of the distribution of superspan features to span FIFOs.

All faces intersecting the superspan are ordered by superspan-minimum range near-to-far (maximum-to-minimum reciprocal range), block 110 of FIG. 9. Blocks 111 and 112 indicate the steps of getting the first superspan (SS) feature for processing and distributing the feature (face) to memories (FIFO) of each intersected span. At the output of range orderer 46 (FIG. 5) there are four memories 49 corresponding to the four spans of a superspan, block 117 of FIG. 9. The memories are first in, first out memories and are referred to as "FIFO" in the flow diagrams. Referring to FIG. 8, superspan 68 includes span F, span G, span H, and span I. A face 70 covers part of the superspan. In this example the face intersects spans G, H, and I. Edge 67 belongs to spans G, H, and I while edge 69 only belongs to spans G and I. Each span memory is of sufficient capacity to hold edge data and associated information for all faces of several superspans.

During distribution of face and edge data to span memories, separable groups of span-faces are identified, block 200 of FIG. 9. A separable group of faces is defined as one which cannot occult another group of faces and thus can be processed separately. Range separability is done separately for each span and considers only those faces which intersect the span (for example, in FIG. 8 face 70 is not considered for span F). If a face occults all other faces in a group, block 113, only the superspan-maximum range of succeeding faces is compared and the greater range saved, block 114 of FIG. 9. This greater range is compared to the superspan-minimum range of the next face. If the superspan-minimum range of the next face is greater than the saved superspan-maximum range of the preceding face, block 115, the current face is range-separated from the preceding faces.

Distribution to span memories 49 (FIG. 5) normally continues until all faces intersecting the superspan have been stored. In some cases the process can be terminated earlier. For example, if a separable group includes an opaque face which covers the span, all succeeding groups at longer range will be occulted and may be discarded. Opaque occultation can be identified per superspan (for simplicity it is only shown per span, block 113 of FIG. 9) and the input terminated when all are so covered (block 120 of FIG. 9). If any span memory 49 becomes full, the sequence is temporarily interrupted until space becomes available.

If a face is stored to one or more span memories 49 the superspan feature identification is sent to the cell texture generator 50 (FIG. 5). Here the numerator terms for Q-calculation are computed and stored in a Q-memory, for availability during span processing.

Basic Span Processing

Figure 10:
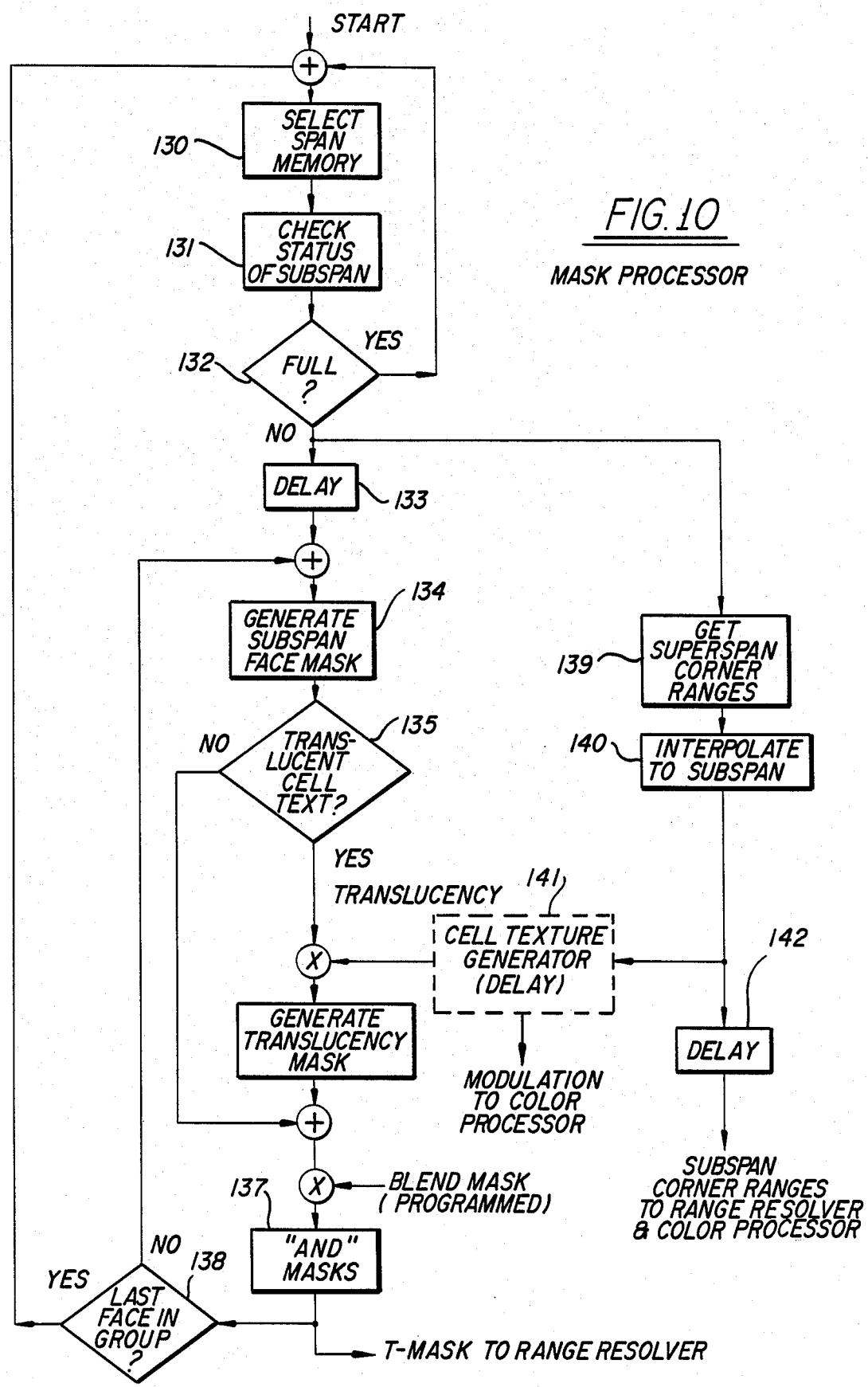
FIG. 10 is a detailed diagram of mask processing in accordance with the present invention.

The first step in span processing, face mask generation by mask processor 52 (FIG. 5) is shown in the simplified flow chart of FIG. 10. After sufficient delay, block 51 of FIG. 5, to permit the cell texture generator 50 to compute Q-numerator terms, data are taken from one span memory 49, one face-group at a time, block 130 of FIG. 10. In the span processor 48 groups of faces are processed interleaved, one subspan at a time (that is, a group of span faces is processed up to four times for four 4-pixel by 4-line subspans in an 8-pixel by 8-line span). Interleaving is similar to that in the previously cited copending patent applications Ser. No. 810,738 and Ser. No. 810,737, except that all faces of a separable group are processed (rather than a single face) before starting a different subspan. Up to 64 subspans are processed before another group of faces of the same subspan are processed. Since, for the same subspan, a later group cannot occult an earlier group, a new subspan is substituted as soon as a current subspan is full (at the end of a group). See the cited patent applications for details of interleaving. Variations peculiar to the depth buffer of this invention are described in proper context in succeeding sections of this disclosure.

Subspan status, fed back from the range resolver 53 (FIG. 5), is checked (block 131). Full subspans are not processed, block 132. As a face is taken from span memory 49 superspan corner ranges are interpolated to the current subspan (blocks 139 and 140) for use in the range resolver. These are also sent to the cell texture generator 50 indicated at 141 in FIG. 10 (range is the denominator term used in calculating Q-terms), along with subspan-face identification. The cell texture generator recovers Q-numerators from internal memory, interpolates them to the indicated subspan, and computes the Q values. Generator 50 performs normal texture processing functions and returns per-pixel translucency and modulation data for the supspan-face.

The first feature of a group of faces is taken from span memory 49 one edge at a time. In the mask generator 52 edges are used to generate a subpixel mask of the subspan feature, 16-subpixels per pixel (block 134). A second subpixel mask is generated for cell texture translucency in block 136 provided that translucency is required, blocl 135. This is done as follows:

1. A 2Kx21-bit lookup table is used external to the pixel mask generator. The most significant address bit differentiates additive and multiplicative translucency, explained below.

2. First time, the lookup table is addressed with translucency and outputs a sparse mask (16-bits) and T value (this first time T is the same as the input translucency). T is saved in a register. The sparse translucency mask is input to the mask generator, 52.

3. Second and ensuing times, the lookup table is addressed with input translucency and T. The lookup table outputs a sparse mask (which is the contribution of the new face only and does not include previous mask bits) and a new T value (identifying the total mask output so far). T is saved as before. The sparse translucency mask is input to the mask generator.

4. When the last face of a group has been processed, the final value of T is output to memory. It is recalled and used to preset a T-register at the start of the next group of this subspan.

5. If the input is opaque, a full mask is output.

6. The sparse mask output from the table is the residue mask (that is, those subpixels not output previously) attenuated for the input cell texture translucency, as follows:

a. If additive translucency is specified (for example trees), the value (representing transparent or representing opaque) is interpreted as a subpixel count. If the residue mask is greater than this, the mask output area will equal the input translucency (scattered pseudorandomly). If the residue mask is less than this, the residue mask will be output. For example, if the residue area were 12 subpixels and the translucency were 8-subpixels, the mask out would be 8-subpixels scattered in previously unused subpixel locations.

b. If multiplicative translucency is specified (for example, clouds), the T value is interpreted as a percent opacity. This fraction of the residue mask is taken (scattered pseudorandomly) for output. For example, if the residue area were 12-subpixels and the opacity were 50%, the mask out would be 6-subpixels scattered in previously unused subpixel locations.

Figures 11, 12:
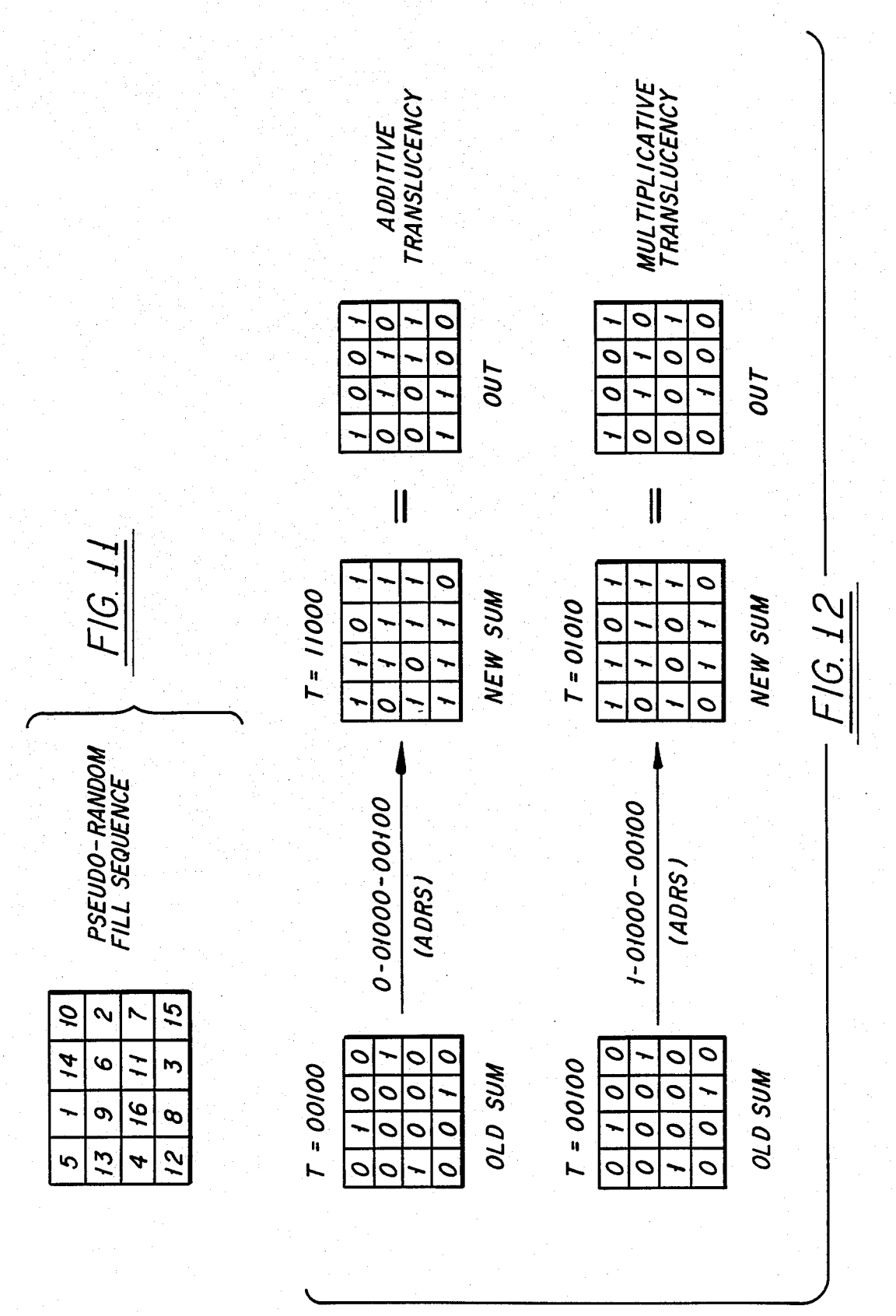

FIG. 11 shows a typical pseudo-random sequence for building up the summary mask. The residue mask is the difference mask between a higher and lower numbered mask. FIG. 12 shows how these would be applied in the above examples.

Inside the mask generator the sparse translucency mask is ANDed with the generated face mask and with the programmed blend mask (block 137 FIG. 10). Mask generation and translucency processing are best done in VLSI circuitry. One chip will normally process one pixel (16-chips for the subspan). If the resulting mask (T-Mask) has finite area (one or more subpixels in the subspan) it is sent to the range resolver 53 (FIG. 5).

Figure 13:
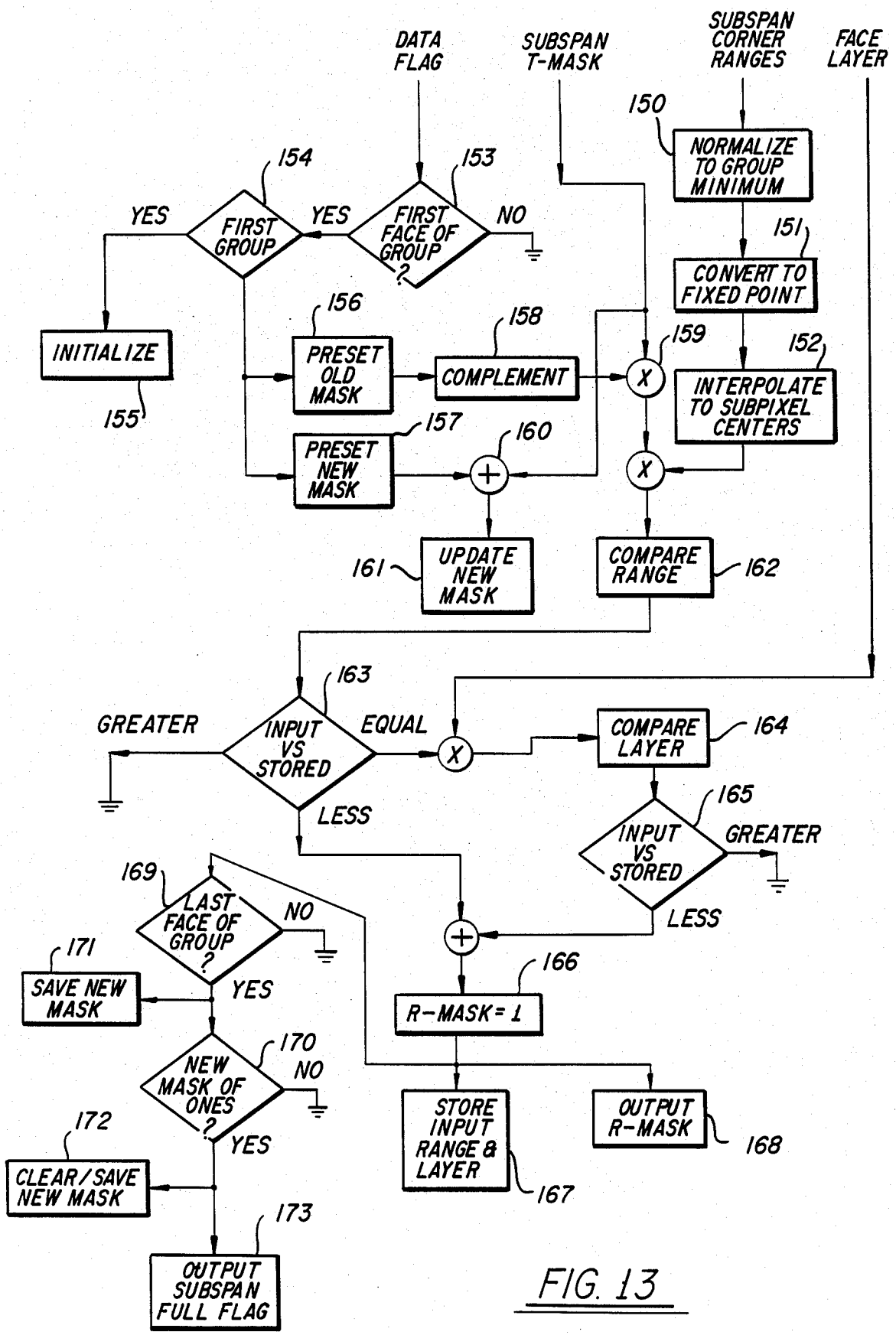
FIG. 13 is a detailed flow diagram of range resolver operation in accordance with the present invention.

A logic flow diagram of the range resolver 53 is shown in FIG. 13. It is only concerned with relative ranges of subspan faces of one group. To simplify the logic, input range data may be normalized to the minimum corner range of the first face of the group (block 150) and converted from floating point to fixed point (block 151). Fixed point ranges are interpolated to subpixel centers (block 152).

At the start of a face group, blocks 153 and 154, the accumulated mask of any preceding groups of this subspan is input and stored in the range resolver 53 as both Old Mask and initial New Mask (blocks 156 and 157), subpixel range registers are preset to maximum range (reciprocal range equals zero), and subpixel layer number registers are cleared to zero (block 155). As a T-Mask of the new group is input, it is ANDed with the negated Old Mask (blocks 158 and 159) to enable per subpixel comparison of interpolated and previously stored range (block 162). It is also ORed with the New Mask and re-stored as the updated New Mask (blocks 160 and 161). See blocks 163 through 168: If the new subpixel range is less than the stored range, it replaces the stored range and an R-Mask bit (meaning modified for range) is output. If input and stored ranges are the same and both have associated layer numbers, the one with the larger layer number is retained. If input and stored ranges are the same and either lacks a layer number, the stored value is retained (R-Mask bit equals zero). Layer numbers are used with coplanar features such as a stripe on a road.

After the last face of a group is processed (block 169) the New Mask is saved in memory as the updated accumulated mask (blocks 171 or 172), for use with the next group of this same subspan. If the New Mask is full (block 170), processing of the subspan is complete and a Subspan Full flag is generated (block 173). The Subspan Full flag is used to update Subspan Status (to prevent processing additional groups of faces for this subspan) and is sent to color processor 54 (FIG. 5) to enable storage to video memory 56 (FIG. 5).

Figure 14:
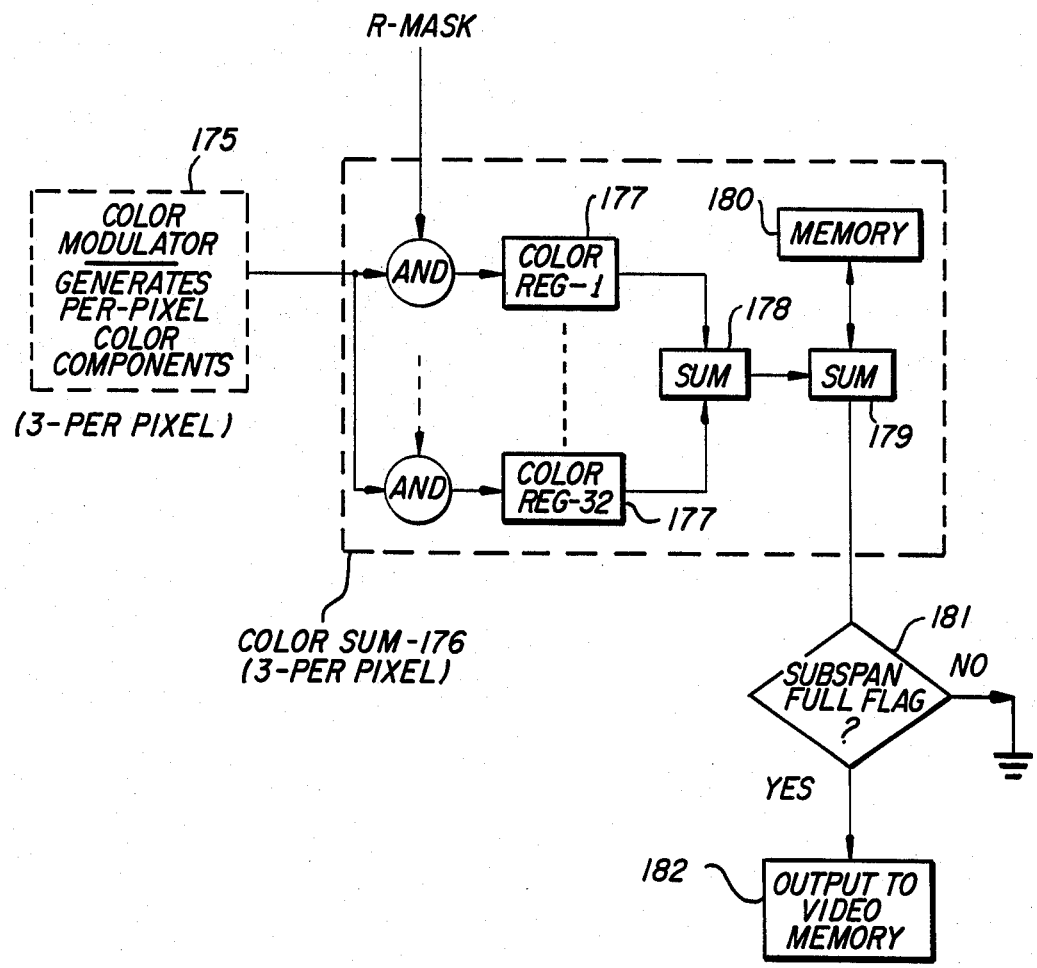
FIG. 14 is a combined flow and block diagram of the color processor.

Color processing is shown in FIG. 14. During range resolution the per-pixel face color is being generated (block 175). This is similar to the color modulation function of the previously cited copending patent application Ser. No. 810, 738 and Ser. No. 810,737, except that per-pixel area is not included (taken as unity, for one subpixel). Thus the generated color is:

$$C = F^* I_f^* C_f + (1 - F)^* I_h^* C_h$$

This is best done in VLSI circuitry. Typically, three color modulator chips are used per pixel, each generating one color component. A color component and the final R-Masks from two vertically adjacent pixels (0 to 16 subpixels each), which together comprise one display pixel for interlace smoothing, are processed. Three color sum chips (block 176) are typically used per pixel, one with each color component, as follows: The display pixel mask and one associated 12-bit color are input to a sum chip 176. The input color is stored in internal registers (block 177), as enabled by the corresponding 32-bit R-Mask. The contents of the registers are summed and rounded to a 16-bit result (block 178). When the last face of the subspan group is processed, this sum is added, block 179, to any color accumulated from preceding face groups (input from a 16-bit external memory - block 180) and the result re-stored to external memory. When a Subspan Full indicator is received from the range resolver (block 181) this final sum is rounded to a 12-bit result and output to video memory 56 (block 182).

There are a number of variations of the above-described organization which fall within the scope of this disclosure. Some typical examples are as follows:

1. Different dimension superspans, spans, and subspans can be implemented. The particular organization described was selected based on current VLSI technology and to support system modularity. By replicating a module consisting of mask processor, cell texture generator, depth buffer, and color modulator one can assign different superspans (of the same or different view windows) to different modules, thus increasing system capacity.

2. The New Mask output from the depth buffer, rather than Subspan Status, could be returned to mask generation and used to prevent processing of subsequent group faces which are occulted, thus improving efficiency.

3. Even with the use of Subspan Status to terminate processing, it is still desirable to not store non-contributing faces to span memories. This is because all stored features must be Q-processed in the cell texture generator. To minimize this processing load, a face filter can be employed to further improve efficiency, to delete some unnecessary faces and groups. Typically, this could be located after range ordering and before distribution to span memories. It would take the form of a second mask generator and operate as follows:

a. Generate subpixel masks of superspan features which are not translucent (programmed or cell textured).

b. Accumulate successive masks, noting when subspan areas fill.

c. Flag last entry of a group to identify any subspans which are full and need not process succeeding data. By combining this with range resolution, still greater improvement could be achieved. This would operate as follows:

d. Input all faces, but only permit range-storage of non-translucent faces, until a subspan is full any face which generates a zero output mask can be discarded. After it is full proceed to step-e and thence to either step-f or step-g.

e. Each time a new face is to be input, first input its superspan minimum range to all comparators.

f. If a non-zero mask is generated, input and range-resolve this face as in step-d.

g. If a zero mask is generated (that is, all stored ranges of the subspan are less than the new face minimum), the new face and all succeeding faces can be discarded for this subspan.

4. While range separation is the principal way of grouping faces, this can be supplemented with other techniques. For example, faces of a convex object cannot occult one another and therefore can be assigned to different groups.

Forced breaking or separation of groups into subgroups may be used if the number of faces in a group is excessive or if it is necessary to maintain adequate fixed point precision or separation of groups. Fixed point precision may be limited by a desire to limit the required word size for range in the processor. For example, it is desirable to have a word size of 24 bits but no more than 32 bits. If the range covered by the group of faces is too large, discrimination precision may be lost. If precision decreases below a predetermined value, a break can be forced by one or more of the following procedures.

For a "simple overlap" at face N, the first group can be terminated with face M and a next group started with face M, i.e., repeat face M. A simple overlap can be defined by a face N which does not overlap the maximum range distance of an immediately preceding face M. In processing face M in the first group, the range resolver mask is adjusted so it does not include subpixels whose color has been assigned by face M. The mask sent to the color processor indicating face M contributions to the mask must be flagged so the color processor will clear the indicated registers. Of course, it is not necessary to repeat face M if it and face N are of the same object.

For overload management, clearing the color sum registers could be made conditional on whether a subspan full indication occurs with face M. If there is a subspan full indication at face M, face M could be capped and processing stopped at that point without proceeding to the next group. Sequencing (the order in which spans are taken from span memory 44) can be resolved by identifying the overlap condition at the output from range orderer 46 (FIG. 5), flagging the face which is to be repeated, detecting the flag as data are sent to the span processor 48 (FIG. 5), saving this face M as the continue address rather than that of face N, and sending this flag to the span processor 48 to control this special action.

The above described procedure may be extended to prevent breaking at any face which establishes a new maximum range distance by repeating that face, plus all faces which overlap the previous max range distance of face.

Another method of forced breaking of groups can be implemented by introducing a pseudo face at a specified range. As data are input to range orderer 46, the data are compared to each face's superspan minimum and maximum ranges. Faces which start (have a minimum range distance) before the pseudo face and end (having maximum range distance) after it are flagged for repeat processing. The pseudo face is range ordered with the other faces. Flagged faces from orderer 46 are output normally and also saved. The pseudo face ends a subgroup of faces. The pseudo faces are repeated ahead of any succeeding faces. When the pseudo face is processed, it acts to reset subpixels at a longer range. It has no color associated with it so that these subpixels are left clear in the color sum mask.

Operation

FIG. 15 is an example of processing using a Z buffer method. Each square of FIG. 15 represents a pixel. Each entry of the matrix in the square represents a subpixel. Mask identifiers $P_1$ through $P_5$ of the second column indicate true priority from highest to lowest, respectively. $R_1$ through $R_5$ represent the resulting range generated from the preset range register values (range IC, Col. 1) and the mask (Col. 2). For example, in row one, the range for the mask is preset to a maximum range of infinity (reciprocal range is zero). The priority masks show the subpixel masks of the associated pixel-faces. The result of combining range register values and the Phd 3 mask is a range store having the first three rows of the pixel represented by $R_3$. Note that since there is no mask entry for the bottom row in the $P_3$ mask the preset range maximum remains as the entry for the bottom row. The output mask corresponds to entries for the determination of pixel color. The range store values plus the output mask values results in a color store matrix as shown in the last column of the first row in which $C_3$ is entered into the first three rows of the pixel but the last row remains unchanged. This results in a color sum for the pixel of $12C_3$ where $C_3$ represents the color of the face, i.e., 12/16 or ¾ of the pixel color is color $C_3$. The next mask is the fifth priority mask which includes entries for all entries of the matrix of the subpixel mask. Since $P_5$ is a lower priority than $P_3$, the output mask results in entries being changed for priorities lower than $P_5$. Any entries greater than $P_5$ remain unchanged. Thus, the bottom row of the range store mask is changed to $R_5$. The range store mask combined with the output mask results in a color store having the first three rows of $C_3$ as before and the last row having an entry of $C_5$ corresponding to a fifth color. The resulting color sum is $12C_3$ plus $4C_5$. This processing continues until all of the priorities are completed. The final color sum resulting from the priority mask given in the example results in a color sum for the pixel of $5C_3+1C_5+4C_2+4C_1+2C_4$. Note that although the features are not necessarily processed in priority order, the resulting pixel color is correct.

A time savings can be attained in the processing of color masks by compensating for unfilled subpixels rather than processing additional groups of faces in order to color fill all subpixels. For example, if 15 of 16 subpixels in a pixel have been filled, the last subpixel could be assumed to have a color intensity which is proportional to the filled subpixels. In a preferred embodiment, each subpixel color intensity is defined by a set of three 12-bit numbers, one number each for red, green and blue. The color processor 54 (FIG. 5) performs a color sum (COLSUM) adding the intensities associated with each subpixel for each of the red, green and blue colors. These summed intensities are then used to drive the corresponding red, green and blue guns of a cathode ray tube to produce the correct pixel color on a display screen. If one or more subpixels are left unfilled, the summed intensities for each color will be less and result in a washed out or faded appearing pixel. The present invention compensates for the reduced intensity by multiplying each of the summed intensity values by the inverse of the number of filled subpixels. For example, given one unfilled subpixel, each summed color intensity value is multiplied by 16/15. For three unfilled subpixels, each summed color intensity value is multiplied by 16/13. In this manner the color intensity for a pixel is increased without changing the color established by the filled subpixels.

Implementation of Range Resolver

Figure 16:
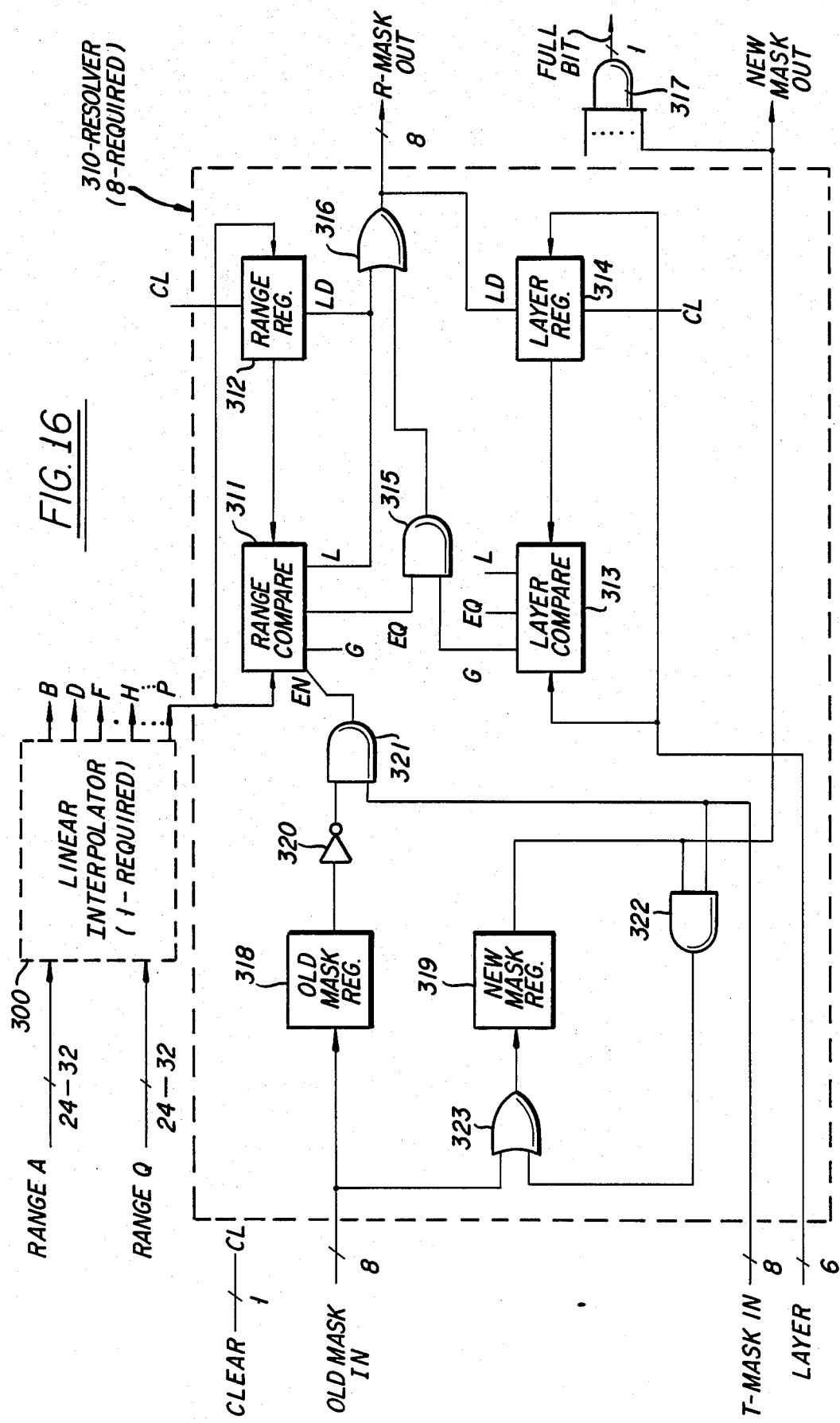
FIG. 16 shows an implementation of the range resolver in a VLSI chip.
Figure 17:
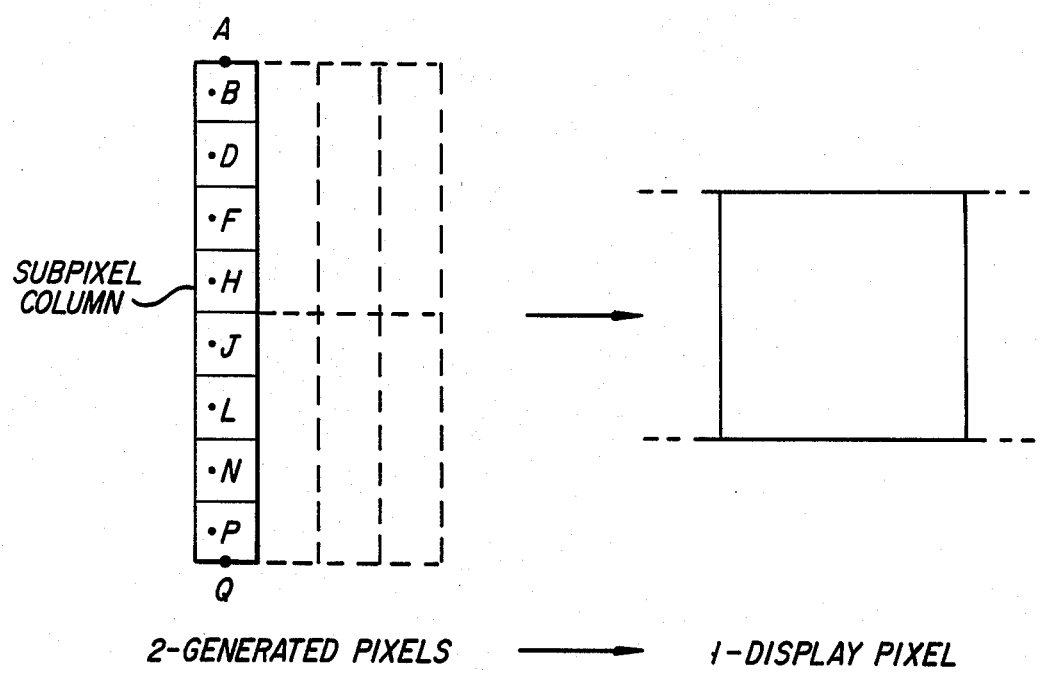
FIG. 17 illustrates a range interpolation done internal to the range resolver VLSI chip.

FIG. 16 shows an implementation of the range resolver 53 (FIG. 5) in a VLSI chip format. The circuitry of each chip performs range resolution for 8-subpixels with four chips being required per display pixel of 32-subpixels. Range inputs A and Q correspond to the range of a subpixel column at top and bottom, as shown in FIG. 17. Ranges A and Q are linearly interpolated to subpixel centers in block 300 of FIG. 16 and since standard mathematical interpolation methods are used, this is not shown in detail. Interpolated outputs are points B,D,F,H,J,L,N, and P. There are eight subpixel resolvers 310 in a VLSI chip. Each receives one interpolated range from block 300.

At the start of a subspan face group an old mask is preset to both Old Mask register (block 318) and New Mask register (block 319). If the face group is the first group in the subspan, the old mask input is all zeros. The Old Mask is a summary mask of faces which occult those of the new group (shorter range). It is used to inhibit corresponding subpixels of an input face mask (T-Mask) from being processed (blocks 320 and 321). The New Mask register is updated with the input face masks (blocks 322 and 323) and is output at the end of the face group as the updated old mask.

At the start of each subspan face group, the Range register (block 312) and Layer register (block 314) are cleared to zero. When enabled by a T-mask subpixel, interpolated range is compared in block 311 with previously input range from block 311. If the interpolated range is the lesser, this range is loaded to the Range register and the corresponding subpixel of the output R-Mask is set to "one". If the interpolated range is the greater, the Range register is not updated and the R-Mask subpixel is zero. If the interpolated range equals the previous range, the result of Layer Number comparison is considered.

A layer number associated with the face being processed is input to the chip and compared, for each subpixel (block 313), with previously input layer number from block 314. One is only concerned with the result when the input layer number is the greater, and then only when the interpolated range equals the stored range. This can occur if there are coplanar faces (same range), such as a stripe (higher layer number) on a road (lower layer number). When this occurs, the R-Mask subpixel is set to "one" by block 315. The Layer register 314 is updated whenever the R-Mask output is "one".

The above sequence continues for as many faces as there are in the group. When the last face of a group is output, the new mask output is examined (bits ANDed in block 317) to see if all subpixels are "one" (full). The outputs from all 32 VLSI range resolver chips are ANDed externally (not shown) to generate a Subspan Full flag, to enable storage to video memory and to inhibit subsequent processing of additional faces in this subspan.

The range resolver design can be varied in several ways. For example, its size (8-subpixels) was selected because of subpixel quantization and interlace smoothing. For other applications, a different number of subpixels can be processed per chip. Also, to aid overload management (to minimize the number of faces processed when near capacity), logic can be added to generate the Full Output even though not all subpixels have been processed.

Thus there has been shown a method of using a depth buffer in a real time computer image generation system. The depth buffer operates by ordering features in a superspan by superspan minimum range, near to far. Output from the range ordering are distributed to span memories, where output to a span memory is terminated by an opaque covering feature. Data are taken from the span memories one subspan at a time to generate a subpixel mask of the subspan face. The sub pixel mask is adjusted for features such as translucency, cell texture, etc. The resulting mask is passed to the range resolver. The range resolver receives range at the ends of an 8 subpixel column and interpolates this to the center of each subpixel. It stores the nearest range of any display feature in the span to date, for each subpixel. If enabled by the subpixel mask input, it compares computed and stored ranges and retains the nearer. If the input feature subpixel is nearer than the previously stored subpixel it outputs this as a modified subpixel mask. The modified subpixel mask is then sent to the color processor. The color processor then calculates the feature color intensity control value for each pixel which is then fed to the video memory for controlling pixel intensity to be displayed upon the screen.

From the foregoing, it is now apparent that a novel way of implementing a depth buffer priority processor in a real time computer image generating system has been presented meeting at least the objects and advantageous features set out herein before. It is contemplated that the changes as to the precise processing connections and details of the processing illustrated herein by way of example for purposes of disclosure as well as the precise steps in order thereof in the method, may be made by those having ordinary skill in the art without departing from the spirit of the invention or the scope thereof as defined by the claims which follow:

What we claim as new and desire to secure by letters of patent of the United State is:

1. A method for determining color image information in a computer image generation system for a sequence of display frames for each pixel of an image to be displayed, each frame being defined by a plurality of spans, each span including a respective plurality of pixels, each pixel including a respective plurality of subpixels, and each image being defined by a plurality of faces, each face having a predetermined color intensity value said method comprising the steps of:
    (a) identifying range data for each face appearing in each span, the range data including a minimum range distance and a maximum range distance from a viewpoint to each face;
    (b) ordering the faces into range separable groups for each span in response to the range data identified; and
    (c) processing the groups in group order sequence for each span until a color intensity control value for pixels in the span being processed is determined, the color intensity control value for pixels responsive to the color intensity control values from faces in the groups assigned to corresponding subpixels of pixels in the span.

2. The method of claim 1, wherein step (a) of identifying includes the steps of:
    (d) determining from the range data a face minimum distance from the viewpoint to a vertex of each face;
    (e) determining from the range data a face maximum distance from the viewpoint to a vertex of each face;
    (f) determining for each face within a span a span corner range at each span corner to the plane of the face;
    (g) selecting for each face a corner minimum and a corner maximum range from the respective span corner ranges;
    (h) comparing the face minimum distance and the corner minimum distance for each face;
    (i) selecting the larger value from the step (h) of comparing as the minimum range distance.
    (j) comparing the face maximum distance and the corner maximum distance for each face; and
    (k) selecting the smaller value from the step (j) of comparing as the maximum range distance.

3. The method as in claim 2, wherein step (b) of ordering includes the step of:
    (l) sequentially ordering the faces by minimum range distance for each span.

4. The method as in claim 3, wherein step (b) of ordering further includes the step of:
    (m) sorting the faces into range separable groups, each separable group being defined by faces which have overlapping minimum and maximum range distances.

5. The method of claim 4 further including the substeps of:
    (n) designating a first value equal to the maximum range distance of the first face of a group;
    (o) comparing the first value to the minimum range distance of the next sequential face;
    (p) identifying the next sequential face as a member of the group when the first value is greater than the minimum range distance;
    (q) redesignating the first value equal to the maximum range distance of the next sequential face identified as a member of the group if the maximum range distance of the next sequential face is greater than the first value; and
    (r) repeating step (o) of comparing through step (q) of replacing for every face of a span.

6. The method of claim 1 wherein step (c) of processing further includes the steps of:
    (s) presetting the range value for each subpixel of a pixel in a span to a predetermined value;
    (t) computing a new range value for each subpixel overlapped by a face;
    (u) comparing the respective new range value to the range value for each subpixel;
    (v) replacing a range value with the respective new range value when the respective new range value is indicative of the face being nearer to the viewpoint;
    (w) repeating step (t) through step (v) until all the faces in a group are processed;
    (x) identifying any subpixels in the span which are not intersected by a face from the processed group;
    (y) repeating steps (t) through (x) for the next sequential range groups only for those identified subpixels of step (x) until all subpixels of the span have been intersected by a face or until all groups have been processed.

7. The method of claim 6, further including the step of generating a color intensity control value for each pixel, the color intensity control value corresponding to the area weighted sum of the color intensity values of the faces intersecting the pixel:
    generating a color value for each pixel, the color value corresponding to the area weighted sum of the colors of the faces intersecting the pixel.

8. The method of claim 7 further including the steps of:
    establishing a predetermined minimum number of subpixels required to define color intensity control value for a pixel;

testing each pixel after processing of each range separable group of faces for determining if the predetermined minimum number of subpixels are assigned a color intensity value;

continuing processing of the range separable groups until at least the minimum number of subpixels are assigned a color intensity value; and determining color intensity control value for a pixel with unassigned subpixels by multiplying the summed color intensity values for each subpixel assigned a color intensity value by the ratio of the number of subpixels to the number of unassigned subpixels.

9. The method as in claim 1, wherein step (b) of ordering includes the steps of:

establishing a maximum number of faces allowed in a group; and dividing each range separable group into subgroups such that the number of faces in the subgroup does not exceed the predetermined maximum number allowed.

10. The method of claim 9 wherein the step of dividing includes the steps of:

identifying a face N which does not overlap the maximum range distance of an immediately preceding face M;

ending a first subgroup of faces with face M;

beginning a second subgroup of faces with face M, the second group including face N;

identifying subpixels in the first subgroup having a color contribution from face M; and processing the second subgroup such that subpixels assigned a color intensity value by the first subgroup not including face M are fixed and the color intensity values of all other subpixels are determinable from the second subgroup and succeeding groups of faces.

11. The method as in claim 9 wherein the step of dividing includes the steps of:

introducing a pseudo-face at a predetermined range;

identifying faces having a minimum range distance less than that of the pseudo-face and a maximum range distance greater than that of the pseudo-face;

ending a subgroup of faces with the pseudo-face; and repeating processing of each of the identified faces as the beginning of a next succeeding subgroup of faces.

12. The method as in claim 1 wherein steps (b) and (c) of ordering and processing include the steps of:

arranging the groups of faces into a sequence of groups for processing, the sequence comprising a minimum range ordered group for each of a plurality of spans followed by a next nearest range group for each of the spans until all groups are sequenced;

processing the sequenced groups by span until a span has a color intensity value assigned to each subpixel; and substituting a new span for the processed span.

13. The method as in claim 12, further including the steps of:

dividing each span into a plurality of subspans;

providing a subspan processor for each subspan; and processing each subspan in parallel with other subspans of the plurality of subspans.

14. A method for determining color intensity control information in a computer image generation system for pixels to be displayed, wherein each pixel includes a respective plurality of subpixels, the pixels defining an image, wherein features of the image are defined by faces, each face having a respective apparent range from a viewpoint to a predetermined location and a predetermined color intensity value associated therewith, comprising:

identifying faces of the features which intersect a projection into face space of the pixels to be displayed;

ordering the identified faces into range separable groups in response to the respective apparent ranges;

processing the range separable groups for determining the color intensity contribution of the faces of a range separable group to subpixels of pixels whose projections into face space are intersected by the faces of the range separable group, the determining in response to the apparent range and opacity of the intersecting faces; and assigning a color intensity control value to a pixel to be displayed in response to the color intensity contribution determined for each subpixel of the pixel to be displayed.

15. The method as in claim 14, wherein the step of processing includes the steps of:

generating a subpixel mask for the pixels whose projections are intersected; and terminating the step of processing for the range separable group being processed and for all remaining range separable groups for pixels whose subpixel masks are full so that subsequent faces would be occulted by the pixels whose subpixel masks are full.

* * * * *